Feb. 21, 1956 W. D. SHIREMAN 2,735,723
TRACTION ATTACHMENT FOR VEHICLE WHEELS
Filed July 2, 1953 2 Sheets-Sheet 1

William D. Shireman
INVENTOR.

Feb. 21, 1956 W. D. SHIREMAN 2,735,723
TRACTION ATTACHMENT FOR VEHICLE WHEELS
Filed July 2, 1953 2 Sheets-Sheet 2
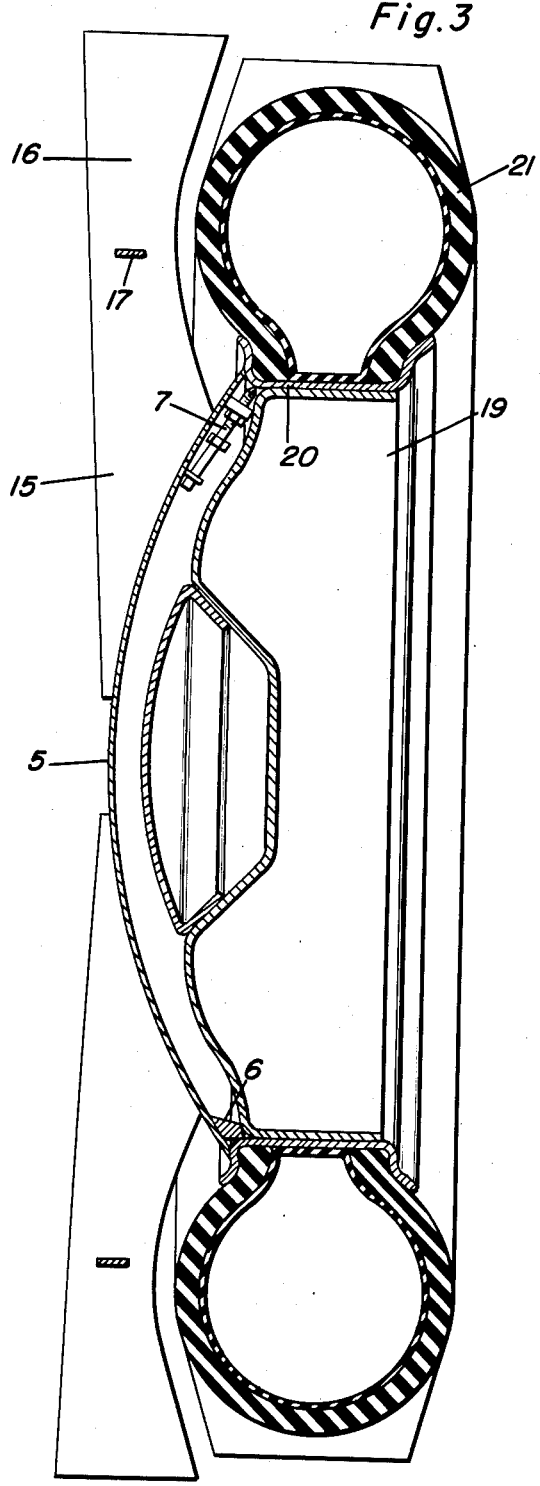
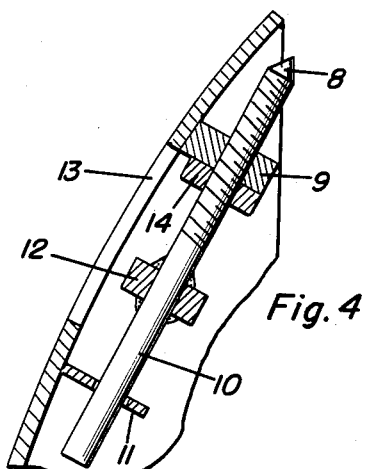
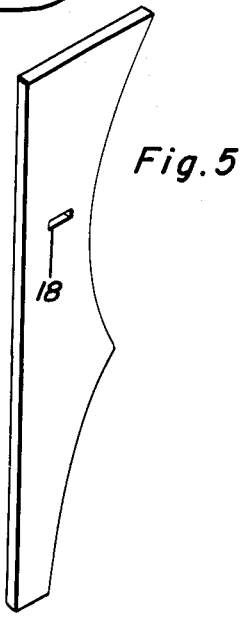
William D. Shireman
INVENTOR.

United States Patent Office 2,735,723
Patented Feb. 21, 1956

2,735,723

TRACTION ATTACHMENT FOR VEHICLE WHEELS

William D. Shireman, De Witt, Ark.

Application July 2, 1953, Serial No. 365,700

4 Claims. (Cl. 301—44)

The present invention relates to new and useful improvements in traction attachments for vehicle wheels when used in mud, snow or soft ground.

An important object of the invention is to provide an easily attachable traction device having pressure or clamping screws which are tightened against the tire rim to secure the device thereto.

Another object is to provide a concavo-convex disk to the inner surface of which the clamping screws are secured and attaching radially extending fins or cleats to the outer surface of the disk and which project outwardly beyond the tread of the tire to function as paddles as well as cleats in increasing the traction for the wheel.

A further object is to provide a traction device of this character of simple and practical construction, which is efficient and reliable in operation, strong and durable relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged sectional view taken on a line 3—3 of Figure 1;

Figure 4 is an enlarged fragmentary sectional view taken on a line 4—4 of Figure 2; and Figure 5 is an enlarged perspective view of one of the fins.

Figure 1:
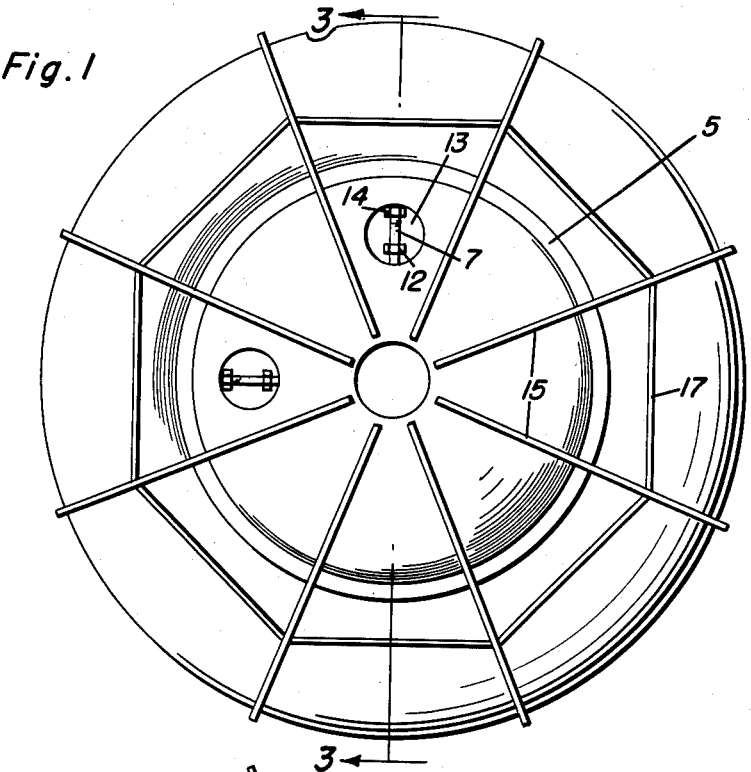
Figure 1 is a front elevational view showing the traction device mounted on a wheel.
Figure 2:
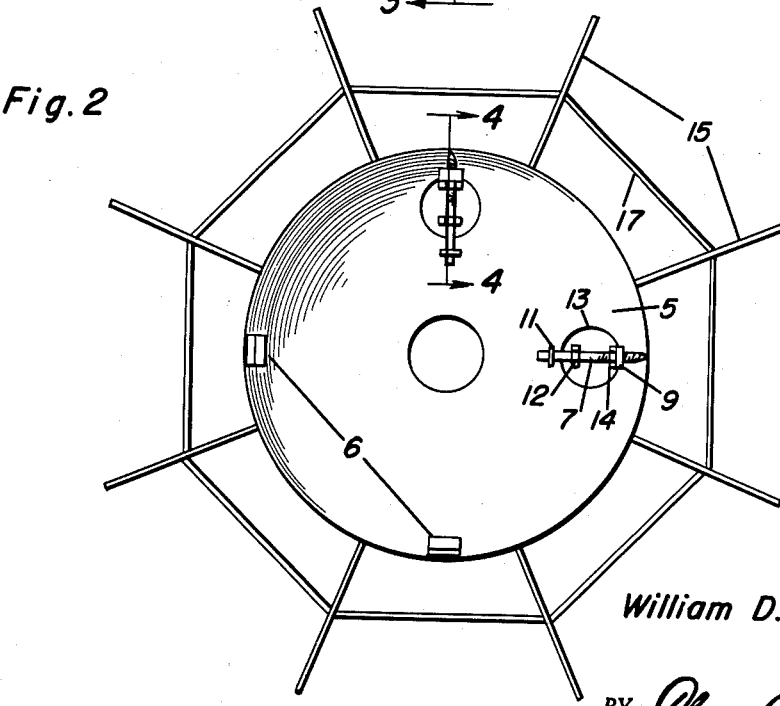
Figure 2 is a rear elevational view.

Referring now to the drawings in detail, wherein for the purpose of illustration I have disclosed a preferred embodiment of my invention, the numeral 5 designates a concavo-convex metal disk having a plurality of lugs 6 welded or otherwise suitably secured to the concaved surface of the disk adjacent its periphery.

Clamping screws 7 are positioned radially on the concaved surface of the disk adjacent the periphery thereof and diametrically opposite with respect to the lugs 6. The screws 7 have a pointed outer end 8 threaded in lugs 9 welded to the disk and the rear or inner ends of the screws are formed with smooth shanks 10 which are slidable in apertured lugs 11 also welded to the disk. A nut 12 is welded to each shank 10 in the region of an enlarged wrench receiving opening 13 in the disk and a jamb nut 14 is threaded on the screw for tightening against lug 9 to lock the screw from radially inward movement.

A plurality of sheet metal fins 15 are welded edgewise in a radially disposed position on the convex or outer surface of disk 5 and the outer ends of the fins project outwardly beyond the periphery of the disk to form cleats or paddles 16. Braces 17 have their ends welded in openings 18 in adjacent fins.

The disk 5 is attached to a vehicle wheel 19 by placing the lugs 6 and point ends 8 of the screws 7 against the internal diameter of the tire rim 20 and the screws are tightened against the rim to clamp the disk on the outer surface of the wheel and with the outer ends or cleat portions 16 of the fins positioned radially at the outer side of the tire 21 and projecting beyond the tread of the tire.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a traction device for vehicle wheels, a disk, internal wheel rim clamping means supported in a protected position behind the disk and manipulated from a position at the front of the disks, fixed wheel rim engaging means internally of the disk and positioned in diametrically opposed relation to said wheel rim clamping means and coacting with each other for clamping engagement internally of the wheel rim for mounting the disk at the side of a wheel, and a plurality of fins welded edgewise against the outer surface of the disk in a radially disposed position and projecting outwardly beyond the tread of the wheel.

2. In a traction device for vehicle wheels, a disk attaching means carried by the disk for mounting the disk at the side of a wheel, said attaching means including a fixed lug on the inside and adjacent the periphery of the disk, a radially adjustable screw carried in a protected position behind the disk and diametrically opposed to the lug, said lug and said screw having internal clamping engagement with the rim of the wheel, and a plurality of fins welded edgewise in a radially extending position against the outer surface of the disk and projecting outwardly beyond the tread of the wheel.

3. The combination of claim 2 wherein said disk is formed with an opening in the region of the screw for manipulating the latter from a position at the outside of the disk.

4. In a traction device for vehicle wheels, a disk attaching means carried by the disk for mounting the disk at the side of a wheel, said attaching means including a fixed lug on the inside and adjacent the periphery of the disk, a radially adjustable screw carried in a protected position behind the disk and diametrically opposed to the lug, said lug and said screw having internal clamping engagement with the rim of the wheel, a plurality of fins welded edgewise in a radially extending position against the outer surface of the disk and projecting outwardly beyond the tread of the wheel, and circumferentially arranged braces fixed to and extending between adjacent fins.

References Cited in the file of this patent

UNITED STATES PATENTS

| 1,110,156 | Stewart | Sept. 8, 1914 |
| 1,627,371 | Bierman et al. | May 3, 1927 |
| 2,200,791 | Frisbie | May 14, 1940 |